United States Patent [19]
Traut

[11] 3,955,360
[45] May 11, 1976

[54] INTEGRATED FLOW WASHBOARD TURBINE

[76] Inventor: Earl W. Traut, 8040 Palm Lake Drive, Fort Lauderdale, Fla. 32811

[22] Filed: July 8, 1974

[21] Appl. No.: 486,312

[52] U.S. Cl................................ 60/39.36; 60/39.66; 60/39.75
[51] Int. Cl.²............................. 415 76; F02C 3/06; F01D 1/34
[58] Field of Search............. 415/76, 92; 60/39, 66, 60/39.44, 39.75, 39.36; 417/408

[56] References Cited
UNITED STATES PATENTS

| | | | |
|---|---|---|---|
| 1,076,733 | 10/1913 | Anderson | 415/76 |
| 1,088,761 | 3/1914 | Anderson | 415/76 |
| 1,221,500 | 4/1917 | Anderson | 415/76 |
| 1,243,477 | 10/1917 | Anderson | 415/76 |
| 3,225,539 | 12/1965 | Converston | 60/39.44 |
| 3,742,706 | 7/1973 | Klompas | 60/39.66 |

Primary Examiner—William L. Freeh
Assistant Examiner—Robert E. Garrett
Attorney, Agent, or Firm—Julian C. Renfro

[57] ABSTRACT

A turbine for producing power for any of a variety of uses, such turbine having as a principal distinguishing characteristic, the use of a turbine wheel having an active surface of undulating, washboard configuration, against which hot gases are directed in an angular relationship. This undulating portion of the turbine wheel comprises alternating peaks and valleys disposed around the periphery of the wheel on a regular recurring basis. Closely adjacent the undulating portion of the wheel are a series of stationary, exhaust-collecting members that are spaced apart to permit the directing of hot gases at the active sides of the undulations, such that rotation of the turbine wheel in the desired direction is brought about. Within the spirit of this invention are numerous cool-gas-carrying passages in the turbine wheel, finding their exit on the active surface of the turbine wheel, but in each instance on the side of the undulations essentially parallel to the flow of hot gases. Quite significantly, these passages bring about the creation of a layer of cool air which flows along the undulations, shielding them from the deleterious effect of the hot gases, and thereby forming a hot-cold boundary that is adjacent to but spaced from the turbine wheel. This hot-cold boundary acts as a variable "air-blade" which adopts efficient shapes over a broad range of engine speed and load conditions.

20 Claims, 12 Drawing Figures

INTEGRATED FLOW WASHBOARD TURBINE

RELATIONSHIP TO PRIOR INVENTION

This invention bears a definite relationship to my U.S. Pat. No. 3,709,629 entitled "Integrated Flow Gas Turbine", which issued Jan. 9, 1973.

BACKGROUND OF THIS INVENTION

1. Field of the Invention

This invention relates to that class of device involving a rotor having an active surface, with hot gases being directed against such active surface in order to bring about rotation of the rotor at high speed. This invention not only involves a novel rotor configuration, but also a novel arrangement for directing the flow of hot gases and cooling air to the rotor in such proportions as to prevent damage to the rotor at all operative speeds.

2. Description of the Prior Art

Most gas turbines in use today utilize a bladed turbine that is in direct contact with the hot gases generated in a combustion chamber and caused to expand through the blading. Because products of combustion have a very deleterious effect on blading, it is customary to mix large quantities of cooling air with the combustion products in order to prevent overheating of the turbine and consequent blade damage. In addition to the potential damage to the turbine blades that may be brought about by the hot gases, centrifugal forces, gas reaction forces, and high temperatures severely stress the comparatively thin turbine blades now in common use.

Turbine blade cooling by the use of internal passages having orifices opening to the blade surface has been attempted with some measure of success, but for the most part, these attempts have not resulted in the protection of the entire blade surface. It is an important purpose of the present invention to provide several distinct structural improvements over known prior art engines, while still using well known compression, combustion, and expansion-reaction functions in a novel, useful and unobvious way.

SUMMARY OF THIS INVENTION

This invention relates to an integrated flow washboard turbine, and more particularly to a novel engine in which hot gases created by the combustion of fuel in a combustion chamber are caused to impinge upon a specially shaped peripheral portion of a rotor designed to rotate at high speed. A particularly important aspect of my invention involves the creation of a hot-cold boundary adjacent the active portion of the rotor, which hot-cold boundary serves to extend the life of the components to a remarkable degree.

Unlike the devices commonly in use today, my novel turbine rotor employs an active surface in the form of an essentially continuous corrugated surface whose appearance is such as to warrant the nomenclature "washboard". Numerous holes are provided in the peripheral portion of the rotor such that cooling air may be caused to pass through the holes in sufficient quantities as to effectively protect the rotor from damage. As will be seen in detail hereinafter, the washboard rotor utilized in accordance with this invention may be connected to a compressor by a shaft, or may be integral with and preferably radially outward of the compressor.

Thus, although the present invention includes a conventional compressor serving to compress and deliver air to a combustion chamber, it differs substantially from known prior art engines by having attached to the compressor, a turbine rotor containing no blades as such, which turbine rotor serves the function of receiving the reaction or thrust from the high temperature gases, with the reaction of the gases against the peripheral portion of the turbine serving to perpetuate the rotation thereof. Thus, my engine utilizes well known compression, combustion and reaction cycles in a novel and useful arrangement.

All facets of my invention involve a rotor arrangement in which a washboard type surface is presented on the periphery of the rotor adjacent the location where hot gases are directed against the rotor, with the thrust of the hot gases serving to cause further and continued rotation of the turbine rotor. However, one embodiment of my invention involves a centripetal flow arrangement in which the rotor is disposed radially outwardly with respect to the combustion chamber, with the relatively cool incoming air flowing through specially placed apertures in the peripheral portion of the rotor to meet with the products of combustion flowing outwardly through guide nozzles so as to form a highly-advantageous hot-cold boundary serving to extend the life of all the active components.

Other embodiments of my invention involve centrifugal compressor arrangements in which the washboard rotor is disposed upon an outer portion of the blading of the compressor so as to rotate therewith. Compressed air flowing through passages in the washboard rotor meets with hot combustion gases to form a hot-cold boundary of the type previously mentioned. Various intercooler arrangements and/or flow dividers can be used to considerable advantage in these embodiments.

It is therefore a principal object of my invention to provide a novel integrated flow washboard turbine in which a single bladeless rotor is utilized, against which hot gases can effectively react without causing damage.

It is another object of my invention to provide a turbine rotor which includes passages through which comparatively cool fluid may pass, which cool fluid is caused to be interposed between the hot reaction gases and the turbine rotor, thereby effectively protecting the rotor from the deleterious effects of the hot gases.

It is still another object of my invention to provide a turbine engine in which only a minimal amount of cooling air is required, thus reducing the compressor size requirement and increasing the efficiency of the engine.

It is yet another object of my invention to provide a novel arrangement for changing engine operating conditions by varying the cooling air flow instead of varying fuel flow in the conventional manner.

It is yet still another object of my invention to provide an arrangement for hot gases to expand-react against "air blades" which automatically assume efficient shapes during various circumstances of engine operation.

It is yet still a further object of my invention to provide a turbine engine operative at the stoichiometric fuel-air ratio during changing engine loads and during accelerations.

It is yet still another object of my invention to provide a turbine engine operative at extremely high temperatures, with minimal production of oxides of nitrogen.

These and other objects, features and advantages will be more apparent from a study of the appended drawings in which:

FIG. 6 is a cross sectional view of a centrifugal embodiment in which a divided flow path arrangement is utilized.

DETAILED DESCRIPTION

Figure 1:
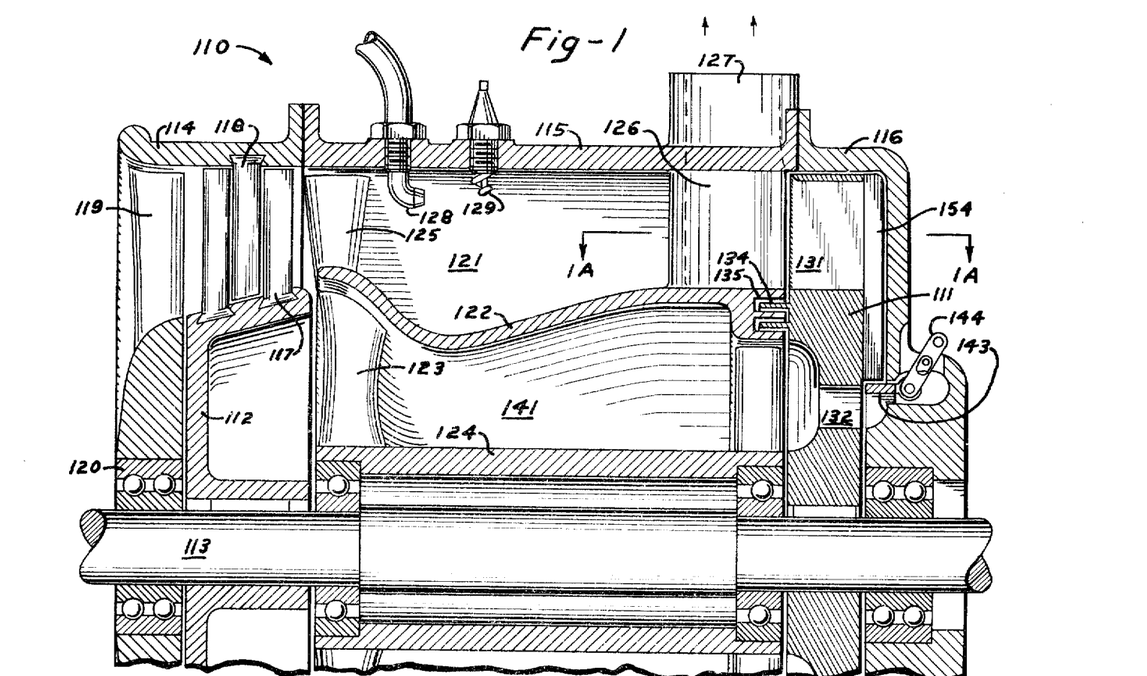
FIG. 1 is a somewhat foreshortened cross sectional view taken longitudinally of the preferred axial flow embodiment of my invention in order to reveal not only the compressor portion thereof, but also turbine details as well.

Turning to FIG. 1, it will be seen that I have there provided a cross-sectional view of a turbine engine 110 constructed in accordance with this invention, involving a turbine rotor 111 and a compressor 112, each of which is keyed to rotor shaft 113 so as to rotate therewith. The shaft 113 is disposed on the centerline of the stationary components of the engine, which involves the compressor case 114, the hot section case 115, and the turbine case 116. The compressor case 114 is bolted to the forward end of hot section case 115, and suitable bearings, preferably ball or roller bearings, are provided at appropriate locations to properly support the shaft 113, and enable it to rotate with a minimum amount of friction being involved. Inlet support bearing 120 is typical of the bearings I employ.

Compressor 112 is a conventional, multi-stage axial-flow compressor having one or more circumferentially-extending rows of blades 117, these blades being interspersed with one or more rows of non-rotating compressor guide vanes 118 mounted in compressor case 114, and extending inwardly therefrom. Inlet guide vanes 119 are also preferably used.

Hot-section case 115 includes an annular combustion chamber 121 which is bounded on its radially outward side by the circumferentially-extending hot-section case outer wall, and on its radially inward side by circumferentially-extending inner wall 122. A series of spaced, radially-extending stationary vanes 123 connect inner wall 122 to hub portion 124 surrounding this portion of the shaft 113, thus to provide and maintain a desired amount of spacing between the hub portion and the wall 122. As will be discussed hereinafter, a circumferentially-extending cool air chamber 141 is defined interiorly of the wall 122. A series of spaced, radially-extending stationary vanes 125 in turn provide support between hot-section case 115 and inner wall 122 at the inlet side of combustion chamber 121.

It will be seen in the somewhat foreshortened illustration of an engine in FIG. 1 that I have provided a plurality of fuel nozzles 128 in the annular combustion chamber 121, adjacent at least some of which are igniters 129. Near the end of the combustion chamber are provided in accordance with this invention a number of spaced, radially extending members 126, separated by passages 138. These members, as revealed in FIGS. 1 and 1A, have arcuate shaped cross-sections, with the interior of each member being configured to provide gas collectors 140 and exhaust ducts 127 that serve to conduct away the hot gases generated in the combustion chamber 121 subsequent to their use in powering the turbine rotor 111. The flow of hot gases from exhaust ducts 127 is radially outwardly.

Figure 1A:
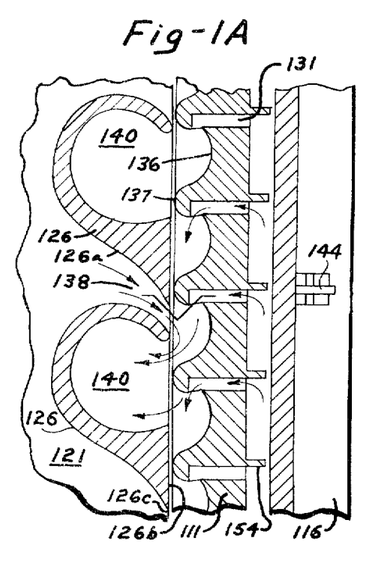
FIG. 1A is a cross sectional view revealing the manner in which hot gases are directed by arcuately shaped stationary members against my novel washboard turbine, this view also revealing the manner in which cooling air may be caused to flow through holes provided in the turbine wheel, which cooling air to a great extent protects the turbine wheel from damage by the hot gases.

From an inspection of FIG. 1A it will be noted that each member 126 has a curved exterior surface 126a that is responsible for directing hot gases from the combustion chamber 121 through the passages 138 at an angle to the centerline of the engine. As should be clear, these passages are disposed at spaced locations about the circumference of the engine, such that hot gases are directed at an angle onto the forward face of the turbine rotor 111 at a number of locations spaced in a circle at the exit side of the combustion chamber.

Figure 3:
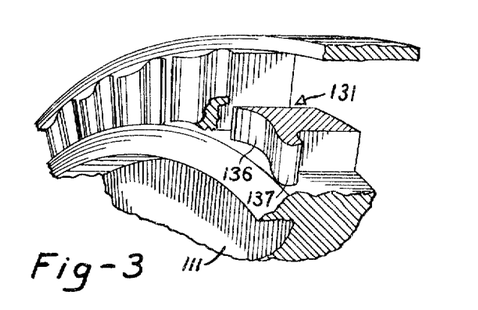
FIG. 3 is a fragmentary perspective view revealing other constructional features of my novel turbine rotor.

The turbine rotor 111 is ring-shaped, and as best seen in FIGS. 1A and 3, has its active surface made up of alternate valleys 136 and peaks 137. Rotor 111 is disposed such that its active surface rotates closely adjacent to the flat rear surfaces 126b of the arcuate members 126.

Figure 4A:
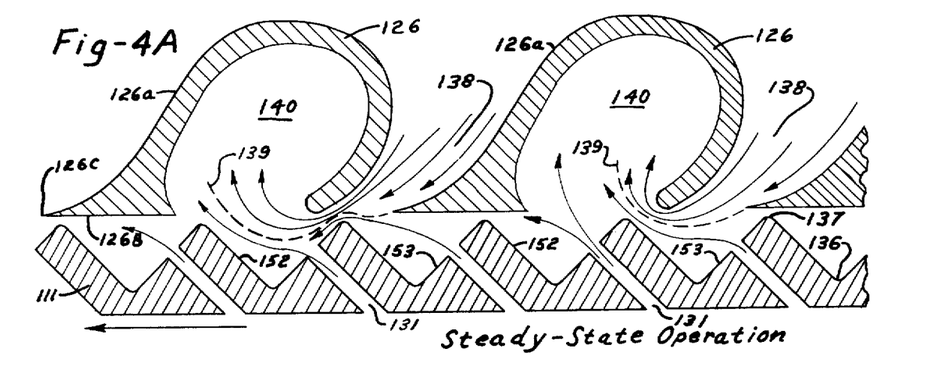
FIG. 4A is a cross sectional view to a large scale revealing the cross sectional configuration of the active portion of my novel washboard turbine, and the interaction of hot and cold gases to form a novel hot-cold boundary.
Figure 4B:
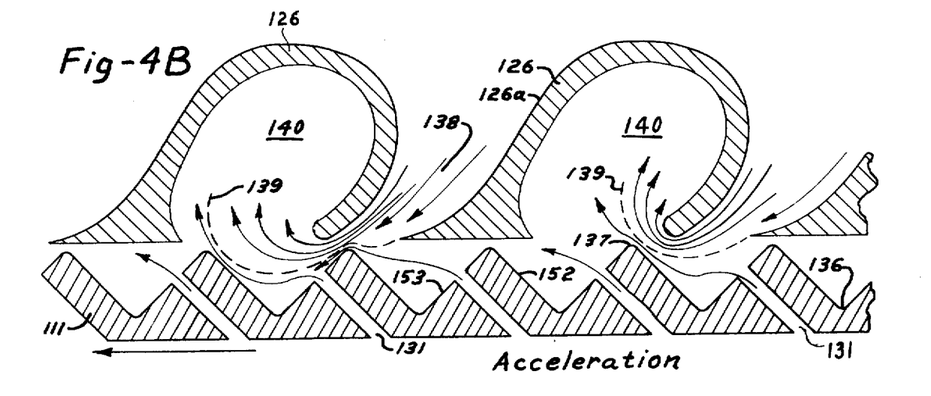
FIG. 4B is a view much like FIG. 4A, but revealing the configuration and location of the hot-cold boundary during acceleration.
Figure 4C:
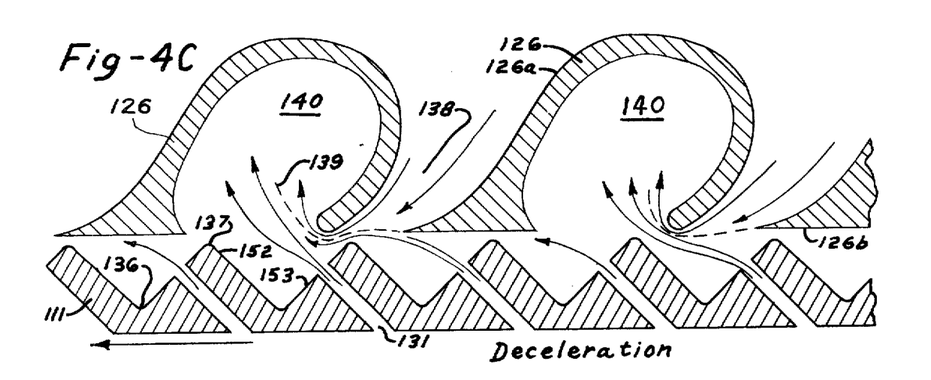
FIG. 4C is another view along the general lines of FIG. 4A, but revealing the configuration of the hot-cold boundary during deceleration.

It will be noted from related FIGS. 4A, 4B and 4C that between adjacent peaks 137 is a surface 152 and a surface 153, with the surfaces 152 being perpendicular to the hot gases emerging from passage 138, and the surfaces 153 being disposed parallel to the passages 138. Quite important to this invention is the provision of a number of cool air passages 131 through which comparatively cool air from the compressor flows. These passages are generally rectangular in cross section, with the major dimension thereof being in the radial direction; note FIG. 3. However, as viewed in FIGS. 4A–4C, the cool air passages 131 may alternately be parallel to the surface 152, and emerge through the surfaces 153. A hot-cold boundary 139, created at the location between the members 126 and the active surface of the turbine rotor where the hot gases from passages 138 meet the comparatively cool air flowing from the passages 131, will be discussed at length hereinafter. To minimize or eliminate engine pulsations, the number of passages 138 should be quite different from the number of peaks 137, and their number should not have a common divisor.

The source of the compressed air flowing through passages 131 is of course the air compressed by the blades of axial flow compressor 112. Although most of this air flows past the stationary vanes 125 into the combustion chamber, to be burned with fuel from nozzles 128, some of the compressed air flows past the movable vanes 142 depicted in FIG. 2, into the cool air chamber or plenum 141 defined between the inner circumferential wall 122 and the hub portion 124. This air then flows aft, entering the holes 132 adjacent the hub of turbine wheel 111 in FIG. 1, and thence radially outwardly between the rear face of the turbine wheel, and the rear wall of the turbine case 116. Thereafter the air flows forwardly through the numerous passages 131 to contribute to the formation of the hot-cool boundary.

Several different arrangements may be used to control the flow of air through the plenum 141, and thereafter through the passages 131. One arrangement is of course shown in FIG. 2, wherein movable vanes 142 collectively form a 360° ring at the inlet to combustion chamber 121, each being hinged at vanes 125. Links 145 are located inside vanes 125 and pivot on pins fastened to hot section case 115. A master control ring moves links 145 forward or backward so that they in turn move pins inside vanes 145 which are fastened to vanes 142, causing the vanes to tilt up or down. The up and down movement of vanes 142 selectively varies the proportion of compressed air delivered to the combustion chamber and used for cooling purposes.

As viewed in FIG. 1, an alternate mechanism for controlling the flow of air through plenum 141 uses instead of vanes 142, fore-aft positioning of air flow regulating ring 143 to vary the amount of cooling air delivered to passages 131. Moving the ring 143 toward the turbine rotor 111 as a result of moving linkage 144 restricts the flow of cooling air through the passages 131, whereas moving it aft permits an increase in the flow of this air.

Higher pressure at the exit of the passages 131 can be obtained by utilizing radial vanes 154 on the aft side of the turbine wheel, as best seen in FIG. 1. These vanes are disposed just outward of the ring valve 143, and serve by their rotating action as a centrifugal compressor. Rings 134 and grooves 135 are provided to minimize the flow of gases between circumferential wall 122 and turbine rotor 111.

Turning now to related FIGS. 4A through 4C, it will be seen that a hot-cold boundary (HCB) 139 is formed at each location where cool compressed air emanating from passages 131 meets hot gas emerging from passages 138. Significantly, the hot-cold boundary prevents the hot gases from contacting the essentially perpendicular surfaces 152. Rather, the hot gases deflect into exhaust passages 140 defined inside the members 126. The energy imparted to rotor surfaces 152 by this deflection and simultaneous expansion causes rotation of turbine rotor 111. As previously mentioned, the surfaces 153 are essentially parallel to the flow of hot gases from passages 138, and thus they do not impede their flow. It is to be observed that the hot-cold boundaries (HCB's) always originate at the acute trailing edges 126c of stationary arcuate components 126, and that they terminate in exhaust passages 140. It can also be seen that the shape of each HCB 139 changes greatly as peaks 137 of rotor 111 move through the flow of hot gases emanating from passages 138. However, during steady-state operating conditions illustrated in FIG. 4A, these shape changes are repetitive; that is, each time peak 137 is in the same position relative to passage 138, the HCB will have the same shape. Cooling gases flow through orifices 131 in sufficient quantity to maintain a constant air cushion between the hot gases and surfaces 152 and 153, after which they exhaust through passages 140 and ducts 127, mixing therein with the exhausted hot gases.

The pressures on either side of the HCB must necessarily be equal at all timed, otherwise the HCB would shift towards the direction of lower pressure until a stable pressure condition was reached. The tendency will always be for a stable HCB location because, all parameters being equal, independent movement of the HCB would tend to increase the pressure of the gas on the side to which it was moving and decrease the gas pressure on the other side; these pressure changes thus tending to move the HCB back to its original position.

Although the inertia of the hot gases tends to deflect the HCB's towards surfaces 152, gas pressures on both sides of the HCB's remain equal and are both considerably higher than the pressure in exhaust duct 140. For these two reasons the tendency of both the hot and the cold gases will be to enter the exhaust rather than to mix with each other prior to their entry into exhaust duct 140.

Thus it will be seen that relatively small changes in pressure of either the hot or the cold gases will cause a shift of the HCB's toward the direction of lower pressure. It should also be apparent that a change in the volume-flow or mass-flow of either the hot or the cold gases will similarly cause the HCB's to move away from the gases whose volume or mass has proportionately increased. As will be discussed later, varying the pressure or mass-flow of the cooling gases can be used as a novel and convenient means of controlling the power output of my turbine.

In FIG. 4B, approximate positions of HCB's 139 are shown as they would appear during acceleration. Increase in pressure of hot gases or their mass-flow with respect to the cool air pressure or mass-flow will cause an overall movement of the HCB's toward surfaces 152 and 153. Acceleration is a critical operating parameter change in that the ratio of hot gas mass-flow to cooling air mass-flow must not be allowed to increase to the extent that the layer of cooling gas on surfaces 152 or 153 is eliminated or is too thin to adequately protect the rotor. Ideally during maximum acceleration, the HCB's will move close enough to rotor surfaces 152 and 153 to provide the minimum allowable degree of cooling gas protection until acceleration is complete, and then will move back to an appropriate steady-state location.

FIG. 4C shows the approximate locations of HCB's 139 during deceleration. Decrease in pressure of the hot gas or its mass-flow with respect to the cooling gas pressure or mass-flow causes the HCB's to move away from surfaces 152 and 153. This pressure ratio or mass-flow ratio must not be allowed to decrease to the extent that the flow of hot gases is cut off at the exit of passages 138; also sufficient hot gas flow must be main tained to assure a combustible fuel-air ratio in the combustion chamber. Restriction of the total cross-sectional area of slots 131 with respect to the total cross-sectional area of passes 138 is one means of automatically limiting the cool gas pressure or mass-flow to an acceptable level during deceleration.

In FIGS. 4A, HCB's 139 are shown in a position more or less intermediate between surfaces 152 and 153 and stationary arcuate members 126, which is about where they would be located during normal power operation of the engine. With proper internal engine design, during maximum power operations the HCB's will be depresses deeply towards surfaces 152 and 153 similar to FIG. 4B; and engine idle operations should result in shallow HCB's similar to those in FIG. 4C.

Therefore, it can be seen that the HCB's will automatically adopt efficient shapes for various steady-state operating parameters as well as during acceleration and deceleration. I thus have provided variable-shaped "air blades" which automatically adopt efficient shapes, whereas the metal blades of conventional gas turbines are efficient only over a limited range of operation.

Generating HCB's with a slotted washboard has an advantage over using blading for this purpose as in my Integrated Flow Gas Turbine, U.S. Pat. No. 3,709,629. In the present invention, surface 152 acts as a solid "backstop" to prevent excessive deflection of the HCB's, whereas in my patent cited above, instead of a solid "backstop", a deep cushion of resilient compressed cool air emerging from between blading serves this purpose, resulting in a greater deflection of the HCB's for comparable operating conditions. This resiliency may be desirable in some applications, but requires a relatively large flow of cool gas. However, in the present device, the cross-sectional area of slots 131 is proportionately smaller than the cross-sectional area between the IFGT blading, thus showing that less cooling air will be required in the present device than in the earlier invention, resulting in reduced compressor requirements and an increase in overall engine efficiency.

In the present Integrated Flow Washboard Turbine, as in other gas turbines, a very simple pressure relationship exists: Air pressure increases from ambient to its maximum as it proceeds through the compressor; gas pressure drops slightly as it flows from the compressor outlet through combustion chamber to the turbine inlet nozzle, mainly due to the internal friction and inertia losses; and gas pressure drops further through each stage of turbine blades and guide vanes, returning to ambient pressure as it departs the exhaust duct. Of course, internal gas mass-flow velocity and temperature change drastically with various operating parameters, but these factors do not greatly affect the pressure drop through the combustion chamber; and in the Integrated Flow Washboard Turbine, the pressure drop of the cooling air as it proceeds from the compressor outlet to the HCB's is not greatly affected either. However, absolute gas pressure at any point in the engine will vary greatly for different operating parameters and the location of the HCB's is greatly affected by gas pressure changes thereat. This makes it advisable to use the same compressed air source for both combustion air and blade cooling air, although separate sources might under some circumstances be practical. Accordingly, I configure the internal design of the instant IFWT so as to provide the same pressure drop through the combustion chamber and passage 138 to the HCB as through the cooling air route to the HCB during normal engine operating conditions.

In conventional prior art gas turbines, control of operating parameters is effected by regulating the amount of fuel entering the combustion chamber; that is, by providing additional fuel when acceleration is desired or when load is increased, or by reducing the amount of fuel when deceleration is desired or when the load decreases. This same means of control may be used with the Integrated Flow Washboard Turbine. With proper internal aerodynamic design, the HCB will automatically assume appropriate positions for steady-state operating conditions and for changes thereto, simply by varying the amount of fuel delivered to the combustion chamber.

However, in the Integrated Flow Washboard Turbine, a unique means of engine control is available which cannot be used in conventional gas turbines; this being by varying the cool air mass-flow to change the position of the HCB's and thereby causing an opposite variation in the hot gas mass-flow. That is, increasing the cool air mass-flow will result in a reduction of the hot gas mass-flow and vice versa. Thus, by varying the mass-flow of the hot gases departing passages 138 and by providing fuel to the combustion chamber in proportion to the compressed air mass-flow therein, the power output and angular velocity of the turbine engine can be varied. This variation will to a limited extent be independent of the compressor mass-flow, due to the variation in the cooling gas mass-flow.

Several means of regulating the amount of hot gas mass-flow in accordance with this invention, as follows:

1. By restricting the flow of air entering the combustion chamber under normal operating condition through use of a throttle or other flow restriction, in which case acceleration would be accomplished by reducing the restriction and deceleration by increasing the restriction.

2. By providing variable pitch compressor stator vanes such as at 118 in FIG. 1, and selectively varying same.

3. By providing movable vanes or similar devices to vary the proportion of compressed air delivered for combustion versus for cooling, as could be accomplished by manipulation of vanes 142 in FIG. 2. Moving the forward edges of these vanes radially outward will reduce the amount of air available for combustion thus tending to cause deceleration and will also increase the mass-flow of cool air at the HCB's, thus reducing the hot gas mass-flow thereat and causing further deceleration. Moving the leading edges of the vanes radially inwardly will have the reverse effects.

4. By providing a means for regulating only the amount of cooling air delivered to the HCB's, such as with air-flow regualting ring 143 in FIG. 1. Moving this ring toward turbine motor 111 will, as previously metnioned, serve to restrict the flow of cooling air to HCB's 139, permitting the HCB's to move away from stationay arcuate members 126 and thus permitting increased flow of combustion products. The air diverted from cooling now adds to the air mass entering the combustion chamber, and with attendent increase in fuel flow causes acceleration, whereas moving ring 143 away from turbine rotor 111 will have the reverse effect, causing deceleration.

If regulating means 4 above is used, cool gases must be at a higher pressure at the HCB's than the hot gases so as to cause deceleration. Referring now to FIGS. 1 and 1A, it will be seen that a simple means of obtaining such higher pressure at the HCB's is to add the aforementioned radially disposed vanes 154 to the side of turbine rotor 111 adjacent hot-section case 116 from locations radially outward of holes 132 to the outer periphery of rotor 111. As revealed in FIG. 1A, the vanes 154 are adjacent the trailing edges of slots 131 with respect to the indicated direction of rotation, and will by their rotating action act as a centrifugal compressor, adding to the pressure of cooling air as it enters slots 131. As can be seen in FIG. 1, movement of ring 143 to the edge of rotor 111 not only eliminates this added centrifugal compression, but also reduces the normal flow of cooling air as would be necessary during acceleration; movement of ring 143 the maximum distance away from rotor 111 will permit maximum flow of cooling gases, permit their compression by vanes 154, and provide a higher pressure and cooling air mass-flow at the HCB's so as to provide any desired degree of deceleration. A further advantage of using selectively positionable vanes 154 is that the cooling gas entering slots 131 will have the same angular velocity as rotor 111, thus resulting in a more predictable and even flow of cooling gases through slots 131.

Of the aforementioned four means of controlling the hot gas mass-flow, the latter is probably the most desirable in that the compresses air output of compressor 112 is not restricted and thus compressor efficiency is not affected. Control of engine would be thus:

1. Engine throttle is connected to a speed governor driven by the engine shaft, which tends to maintain the angular velocity of the engine at the speed selected.

2. Air-flow regulating ring 143 is actuated by the speed governor to achieve the desired speed for any load or throttle setting. The minimum-allowed distance between ring 143 and turbine rotor 111 would limit acceleration to a rate that would prevent the hot gases from getting too close to washboard surfaces 136 and 137. As previously mentioned, maximum deceleration rate can be determined by limiting the cross-sectional area of slots 131 or by limiting the maximum distance ring 143 can move away from rotor 111. Thus, repositioning of the throttle will cause movement of ring 143 by the governor in a direction that will increase or decrease the hot gas mass-flow so as to attain the new speed selected. Alternatively, the selected positionable vanes 142 could be used similarly for regulation.

3. The correct amount of fuel to provide a predetermined fuel-air ratio in the combustion chamber will be determined by sensing the changes in hot gas mass-flow and therewith signalling the fuel control to alter the amount of fuel being provided, as will be discussed later.

A major benefit of using the aforementioned engine control system is that it constitutes a convenient means of providing a constant fuel-air mass ratio, including the ratio which provides stoichiometric combustion; i.e.: conditions wherein the maximum obtainable combustion temperature in air is reached by providing the exact amount of fuel required to combust all the available oxygen. Stoichiometric combustion is desirable in that it is a prerequisite to attaining the maximum possible thermal efficiency in any combustion engine cycle.

Inasmuch as the washboard is protected from high temperatures, the upper temperature limitation of the IFWT now becomes the durability of high temperatures of the materials comprising the stationary components exposed to high heat, such as combustion chamber 121, arcuate members 126 and associated structure. If fuels having stoichiometric temperatures within the temperature limits of current hot-section materials are used, or if conventional hydrocarbon jet fuels are used in an Integrated Flow Washboard Turbine having separate cooling for hot section components, such as compressed air flowing through a cooling jacket peripherally surrounding case 115 and thence radially inwards through internal passages in arcuate members 126, and thereafter exiting through orifices into exhaust ducts 140, then it becomes practical to operate under continuous stoichiometric conditions.

At these elevated temperatures, a high production of oxides of nitrogen would normally be expected, but since all available oxygen theoretically is preferentially used for combustion with the fuel, none would be available to combine with nitrogen and thus oxides of nitrogen could not be produced until after the hot gases depart the combustion chamber. Hot gases would only be able to combine with nitrogen as they mix with the cooling air in the exhaust passages, where they would either be at a temperature low enough to produce only minimal oxides of nitrogen or from where they would immediately expand through another turbine stage to cool them further.

Thus it can be seen that the Integrated Flow Washboard Turbine can provide significantly higher thermal efficiency than a conventional turbine because of its stoichiometric capability. Further increases in efficiency are derived because internal combustion chamber cooling air is not used, resulting in reduced compressor requirements.

Although it might not be difficult to accelerate to steady-state stoichiometric operation using conventional fuel control methods once stoichiometric conditions were reached, further acceleration would be impossible because any additional fuel provided to the engine would not have oxygen with which to combine. Likewise, reduction in the amount of fuel delivered would result in deceleration, but would also result in a situation where there would be an excess of oxygen available to combine with nitrogen and produce nitrogen oxides. It thus becomes apparent that the only way stoichiometric conditions can be maintained during acceleration, deceleration and load changes is by simultaneously changing fuel mass-flow and combustion air mass-flow, maintaining a stoichiometric proportion at all times. This can be accomplished with the previously described engine control system, as will be explained.

A fuel control which would maintain a constant fuel-air mass ratio would simply provide fuel in proportion to the pressure of the air entering the combustion chamber. Such fuel control means are currently in use in conventional turbines, but primarily as a means of limiting fuel flow during engine acceleration. For example, The Gas Turbine Engineering Handbook, First Edition (Gas Turbine Publications, Inc., 1966), on page 166 in FIG. 16 includes a simple mechanism wherein "compressor discharge pressure" varies the position of a wedge under a "Fuel Meetering Valve", thus limiting the maximum valve opening during acceleration to provide fuel flow in proportion to "compressor discharge pressure". Mr. A. W. Judge, in "Small Gas Turbines and Free Piston Engines" (Chapman and Hall, Ltd., 1960), on page 218 depicts and describes a British fuel-air ratio control manufactured by Lucas which also limits fuel flow during acceleration to ar amount proportional to the compressor discharge pressure, but using a different mechanism. On page 219, lines 29-32, Mr. Judge states, ". . . in aircraft engines the preferred method is to control acceleration effects by a fuel flow device dependent upon the compressor outlet pressure, since the air mass flow to the combustion system is proportional to this pressure".

In the Integrated Flow Washboard Turbine, either of the aforementioned fuel-air ratio controls can be used with two modifications: first, instead of using compressor discharge pressure as the regulating means, combustion chamber inlet pressure is used, since some compressed air is diverted between these two locations for cooling purposes and this air does not reenter the combustion process; second, instead of using the fuel-air ratio control only during acceleration, it would be in use continuously as the primary means of fuel flow regulation.

A minor correction of fuel flow for variations in air mass temperature will be appropriate for most turbine applications. This can be accomplished with currently used concepts, including expanding quartz rod means, mercury-vapor filled bulbs, or thermocouple operated means as described by Mr. Judge on page 220 of his aforementioned book. However, in the Integrated Flow Gas Turbine, instead of measuring "tail pipe temperature" or "turbine inlet temperature", changes of the compressed air temperature as it enters the combustion chamber would be used to increase fuel flow in proportion to decreasing absolute temperature and vice-versa.

A second minor correction of fuel flow for variations in humidity may also be appropriate for some applications, inasmuch as the presence of water vapor may reduce by as much as 1% the amount of air available for combustion. A humidistat exposed either to ambient air or compressor inlet air may be used to sense humidity and mechanically or electrically regulate a valve in the fuel control to provide a decrease in fuel flow for increase in humidity and vice-versa.

In the aforecited quotation from Mr. Judge's book, by implication he excludes compressed air velocity as a factor in regulating the fuel-air ratio. This is logical because for any given angular velocity a compressor will deliver an essentially constant volume of gas independent of the temperature and compressor inlet pressure of the gas. And with a fixed combustion chamber inlet cross-sectional area, this results in a proportionally constant compressed air velocity at the compressor outlet. However in the Integrated Flow Gas Turbine, a correction for velocity may be appropriate because during acceleration a greater mass of air enters the combustion chamber due to additional compressed air diverted to that location, and movement of the variable air blades (HCB's) away from the hot gases more fully exposes these hot gases to the lower exhaust duct pressure (reduced back-pressure), thus tending to change the pressure drop through the combustion chamber and velocity of the gases therein. The reverse would occur during deceleration. Such effects could be corrected for by slightly increasing fuel flow during acceleration in proportion to velocity as measured by a pitot tube provided in the compressor inlet; or, by a bellows operated fuel valve, wherein one side of the bellows is connected to combustion chamber inlet pressure and the other side exposed to turbine case pressure, with decreases in turbine case pressure resulting in a slight increase in fuel flow and vice-versa.

To compensate for incomplete combustion, fuel control reaction time, and for minor variations in construction, installation or adjustment, it would probably be desirable to provide a fuel-air mixture which is slightly richer than stoichiometric. This would slightly reduce the hot-gas temperature, which could be desirable, and would also tend to reduce the production of oxides of nitrogen in the exhaust ducts.

Engine starting will be as with conventional turbines in that, after the starter accelerates the engine to minimum speed, ignition is provided and the fuel control valve is opened permitting fuel in a stoichiometric ratio to enter the combustion chamber, ignite, and accelerate the engine to idle speed. To provide a more gradual warm-up of the engine to stoichiometric temperatures, a separate starting fuel control may be used which provides lower operating temperatures until the engine is "warmed-up". Shut down would simply be by closing a "high pressure cock", or with a special fuel shutdown means to assure more gradual cooling of the hot section components.

It should be noted that for stoichiometric operation, once the engine is started and hot section temperatures have stabilized, these hot section components remain at a fairly constant temperature during a wide range of operating parameters including acceleration and deceleration, thus making it practical to use ceramics and similar materials in the hot section with minimal danger of cracking due to thermal shock.

Figure 5:
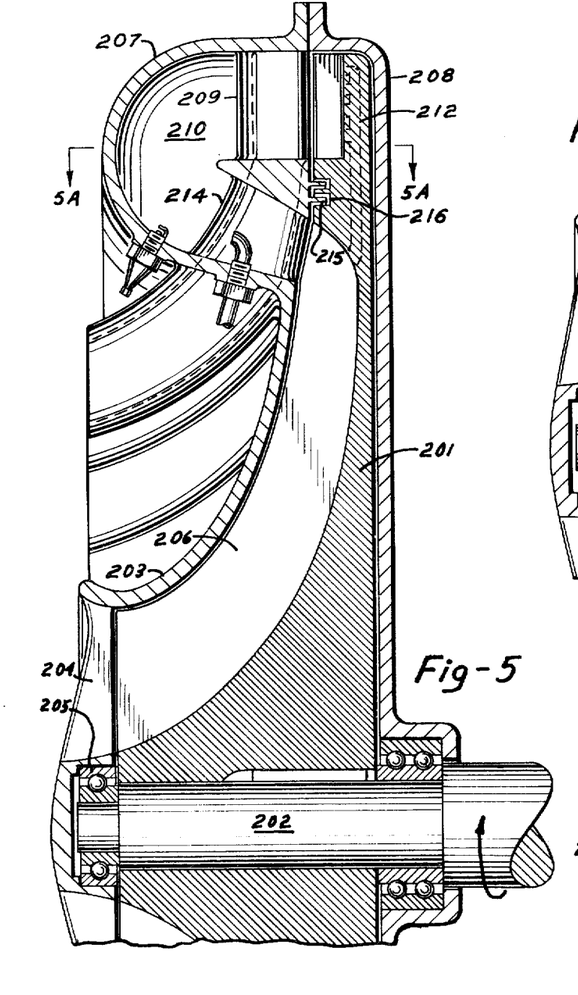
FIG. 5 is a cross sectional view of an axial flow turbine embodiment of my invention with an integral centrifugal compressor, in which embodiment an intercooler may be used.

Turning now to FIG. 5, I have shown there an adaptation of the present invention so as to be usable in conjunction with a centrifugal compressor. In this instance the centrifugal compressor 201 is secured to a rotatable mounted shaft 202, with rotation of the elongate blades 206 of the compressor causing a substantial flow of air outwardly along the interior of the forward engine case 203. Forward engine case 203 contains inlet guide vanes 204 which support both it and forward support bearing 205, and is fastened to or integral with hot section case 207 which in turn is fastened to rear engine case 208.

Near the periphery of blases 206, the flow of compressed air divides, with most of it flowing past exhaust passages 214 into annular combustion chamber 210 and the remainder of the compressed air flowing through passages 211 located in the washboard rotor 212. The washboard rotor is integral with or affixed to compressor 201 such that the two rotate together.

Figures 5A, 6A:
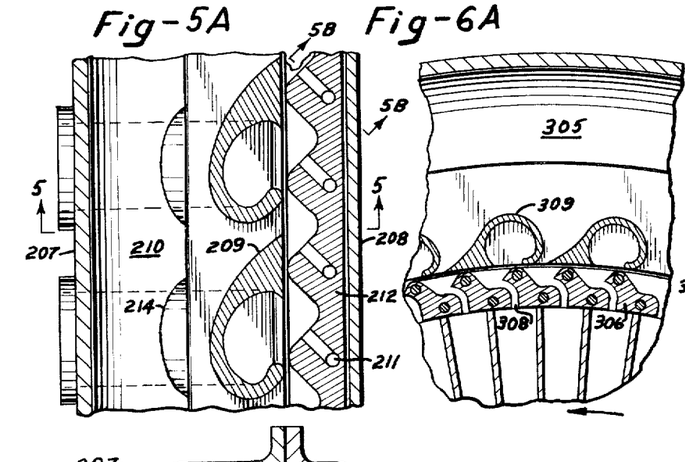
FIG. 5A is a cross sectional view taken along lines 5A—5A in FIG. 5 in order to reveal novel constructional details of the washboard shaped active surface.
FIG. 6A is a view taken along lines 6A—6A in FIG. 6 in order to reveal the novel relationship of stationary arcuate members and the washboard turbine.

As seen in the fragmentary view, FIG. 5A, hot gases created in combustion chamber 210 tend to flow between the stationary members 209 in much the same manner described with respect to the earlier figures of drawing. As a result, the turbine is driven in rotation, this causing a rotation of the compressor 201 anad therefore accomplishing the compression of additional amounts of air. A baffle formed by rings 215 and recesses 216 is provided to minimize the escape of compressed air thereat.

Compressed air flowing past exhaust passages 214 absorbs heat therefrom, and thus this section acts as an intercooler, adding to the thermal efficiency. Exhaust passages 214 could be replaced with an annular intercooler section to permit passage of exhaust gases generally radially inward through it and to permit compressed air to flow through its intervening passages generally outwardly so as to further increase thermal efficiency.

Figure 5B:
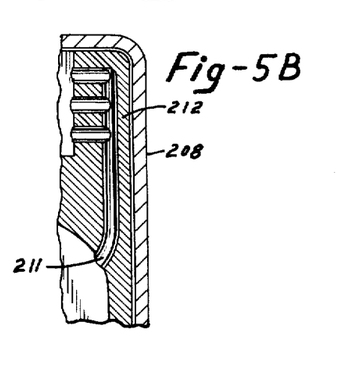
FIG. 5B is a view taken along lines 5B—5B in FIG. 5A in order to reveal to a large scale, the novel coolant passages.

FIG. 5B shows the route of cooling air from the compressor through passages 211 to the active portion of the turbine.

Turning now to FIG. 6, it will be seen that a centrifugal type compressor 301 is mounted upon rotary shaft 302, with air contacted by the blades of the compressor being confined by front engine case 303. Thereafter, the outwardly flowing air encounters a flow divider 304, with part of the air thereafter flowing directly into combustion chamber 305, and the rest of this air contacting the radially inward side of washboard element 306. The washboard in this example is made up of numerous elements 306 which are fastened between support ring 307 and flow divider 304 and rotate with compressor 301. As best seen in FIG. 6A, the air passing through the passages 308 disposed between the washboard elements meets, as previously described, with the hot gases flowing between the stationary members 309. Also as previously described, the hot and cold gases meet at what may be regarded as a hot-cold boundary, with this boundary shifting only to a certain limited extent with the accelerations and decelerations of the turbine.

It should be noted in FIG. 6 that compressed air for cooling is taken from the compressor at a smaller radius than compressed air for combustion, and that the cooling air flowing between washboard rotor elements 306 will therefore be at a slightly lower pressure than the compressed air entering combustion chamber 305. This is to compensate for the friction and inertia losses of the gas as it flows through the combustion chamber and assures that gas pressures on both sides of the hot-cold boundary will be equal during steady-state operation.

Washboard rotors can be integral with the compressor as in FIG. 5, can be fabricated in one or more pieces and fastened to the compressor as in FIG. 6, can be independent of the compressor as in FIG. 1, or can even be associated with a separate cooling air compressor. Washboards can have symmetrically waved surfaces as in FIGS. 4A and 5A or can have differently shaped faces such as the crests in FIGS. 1A and 6A. They can have internal holes or slots or other shaped openings to permit cooling air to pass through them or they can be composed of separate blocks with cooling air passages therebetween as in FIGS. 6 and 6A.

Although FIGS 5 and 6 superficially appear similar because they both utilize a centrifugal compressor, there are a number of significant differences including: the washboard of FIG. 5 is of an axial-flow configuration, while washboard portion of FIG. 6 is radial-flow; the washboard of FIG. 5 is a solid unit whereas that of FIG. 6 is comprised of numerous segments; the cooling-air passages of FIG. 5 are ducts internal to the rotor, but those of FIG. 6 are broad slots; FIG. 5 does not utilize a flow-divider in the manner of FIG. 6; and FIG. 6 does not provide for intercooling of compressed gases entering the combustion chamber as does FIG. 5, although, in FIG. 6 intercooling would be practical by directing the exhaust ducts through the right instead of the left side of the engine.

I am not to be limited to the Integrated Flow Washboard Turbine configurations depicted herein. Though not shown, a radial outflow-inflow washboard is just as practical as the depicted axial-flow and radial inflow-outflow species. In fact hybrids between the axial flow and the other two types are practical, and they result in washboards with axes other than parallel to or perpendicular to the axis of rotation. Thus, at least five basic varieties of washboard rotors are available and each of these can be used in conjunction with or integral with axial flow, centrifugal flow or centripetal flow compressors. Several combinations are readily adaptable for use in conjunction with an intercooler, such as the arrangement in FIGS. 5 and 5A.

Multiple staging of washboard turbines can also be accomplished by directing the exhaust of one washboard turbine through another stage of stationary arcuate members and thence against another self-cooling washboard rotor; and any or all of these components can be integral or operate as separate stages.

It is also quite practical to use some configurations of the Integrated Flow Washboard Turbine as gas generators, in which event either conventional turbine rotors or air cooled rotors such as the one in FIGS. 1 and 3 could be used as power turbines.

Figure 2:
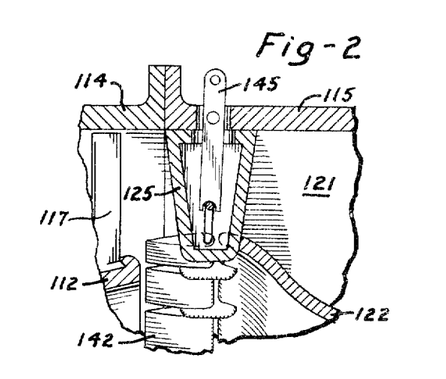
FIG. 2 is a fragmentary view revealing the use of air control vanes at a location adjacent the compressor, in order that the amount of air directed around the combustion chamber and the amount of air directed through the combustion chamber may be carefully proportioned.

Cooling air mass-flow control means such as vanes 142 or ring 143 of FIGS. 2 and 1 respectively can be adapted to nearly every one of the many possible configurations of this invention.

The planetary gearing connections between compressor and turbine or gas generator and power turbine (differential gas turbines) are also adaptable to the Integrated Flow Washboard Turbine, thus adding further to its versatility.

It is important to note that my novel Integrated Flow Gas Turbine is not limited to uses wherein it generates it own hot gases. As a "supercharger" device, operating as an "open cycle" turbine, it may use hot gases such as the exhaust of another device and extract energy therefrom, either compressing its own cooling gas or using cooling gas from another source.

In either "open cycle" or "closed cycle" devices, a cooling liquid may be substituted for the cooling gas. For example, in stationary or marine applications, water could be pressurized and routed internally through the engine shaft and turbine rotor to openings in the rotor facing the hot gases to thus cool the rotor; vaporization of the water would reduce the exhaust temperature and would provide a further hot gas mass from which additional energy could be extracted.

The hot gases and cooling fluid can thus be different materials, and in "closed cycle" turbines, there are further possibilities; after the hot gases and cooling fluids are exhausted they may be separated by condensation of either fluid or by simple fractional distillation of both fluids.

An example of a useful "closed cycle" device using the same fluids for hot gas and for cooling would be an Integrated Flow Washboard Turbine wherein steam at the highest possible pressure is used as the hot gas, and liquid water is introduced through holes in the turbine rotor face as the cooling medium; the exhaust would be condensed and recycled. Freon or other fluids could be used similarly.

I claim:

1. A turbine engine including a turbine wheel with connected compressor, at least one combustion chamber wherein fuel can be burned in order to generate hot gases, said turbine wheel and compressor being surrounded by suitable housing means and being mounted for rotation, with the rotation thereof causing said compressor to supply compressed air both for the cooling of the engine as well as for utilization in said combustion chamber, said turbine wheel having means thereon including a plurality of surfaces that are essentially circularly disposed, the hot gases emanating from said combustion chamber being directly at an angle to the axis of the turbine and toward said surfaces on said turbine wheel, such surfaces being oriented at an angle essentially perpendicular to the direction of flow off the hot gases from said combustion chamber, the reaction of such hot gases upon said surfaces causing said turbine wheel to rotate and thus drive said compressor in rotation, means defining a plurality of cooling air openings in said turbine wheel, means for directing cooling air from said compressor to and through such openings in said turbine wheel such that cooling air is interposed between said surfaces and the hot gases, thus to extend the useful life of said turbine wheel, and common exhaust means for said hot gases and cooling air.

2. The turbine engine as defined in claim 1 in which said surfaces on said turbine wheel are essentially perpendicular to and alternately disposed with a second set of surfaces on said turbine wheel, thus to define a continuous regularly undulating surface.

3. The turbine engine as defined in claim 1 wherein spaced, stationary, radially-disposed members are interposed between the exit of said combustion chamber means and said turbine wheel, with the spaces between said members defining hot gas passages, thus being positioned to direct hot gases at said surfaces of said turbine wheel, said radially-disposed members being hollow and having openings facing said turbine wheel and thereby defining said common exhaust means.

4. The turbine engine as defined in claim 1 in which means are provided for varying the mass flow of said cooling air through said turbine wheel, an increase in cool air mass flow tending to reduce said hot gas flow and conversely a reduction in cooling air mass flow tending to increase said hot gas flow, so as to provide a means for changing operating parameters of said engine with changes in cool air mass flow.

5. The turbine engine as defined in claim 4 in which said varying means is a plurality of movable vanes located adjacent the inlets of said combustion chamber means and said plenum.

6. The turbine engine as defined in claim 4 in which said varying means is a movable ring, adjacent the aft side of said turbine wheel at a location where compressed air from said compressor flows radially outwardly toward said air passages in said turbine wheel, the movements of said ring toward or away from said turbine wheel serving to modulate the flow of air to said air passages.

7. The turbine engine as defined in claim 4 in which essentially radially-disposed vanes on the aft side of said turbine wheel aid the flow of air toward said air passages.

8. The turbine engine as defined in claim 1 in which said engine is an axial flow engine, with said compressor and turbine wheel being interconnected by an elongate shaft.

9. The turbine engine as defined in claim 1 in which said engine has a centrifugal flow compressor.

10. The turbine engine as defined in claim 9 in which said centrifugal flow compressor has an axial flow type undulating surface.

11. The turbine engine as defined in claim 10 in which said centrifugal flow compressor has a tandem radial flow undulating surface.

12. The turbine engine as defined in claim 11 in which said radial flow is an inflow-outflow.

13. A turbine rotor for use in a turbine engine or the like, said rotor being mounted for free rotation about a central axis and being surrounded by suitable housing, said rotor including a circular portion symmetrically disposed with respect to the axis of rotation of said rotor, said circular portion including a large plurality of active and inactive surfaces, said active and inactive surfaces being alternately disposed and together amounting to an essentially continuous wavy surface on said circular portion, each of said active surfaces being disposed at an angle with respect to the plane of said essentially continuous wavy surface such that hot gases may be directed so as to impinge upon such active surfaces and thereby impart energy thereto so as to bring about rotation of said rotor, said inactive surfaces being disposed at a substantially different angle with respect to said essentially continuous wavy surface, such as not to be directly contacted by the hot gases, a plurality of passages disposed through said rotor, with one end of each of such passages being an opening in contact with said essentially continuous surface on said circular portion and with the other end of such passages communicating with a portion of said rotor remote from said circular portion, and means for supplying quantities of cooling fluid to said side of said rotor remote from said essentially continuous surface, with such cooling fluid tending to flow through said passages during the operation of said rotor, such cooling fluid interposing between said active surfaces and the hot gases, thereby to protect said rotor from the deleterious effect of the hot gases so as to extend the life of said rotor.

14. The turbine rotor as defined in claim 13 wherein said circular portion is essentially perpendicular to the axis of said rotor, so that hot gases flow essentially axially thereagainst.

15. The turbine rotor as defined in claim 13 wherein said circular portion is essentially parallel to the axis of said rotor so that hot gases flow essentially radially thereagainst.

16. A turbine engine including a turbine wheel with connected compressor, at least one combustion chamber wherein fuel can be burned in order to generate hot gases, said turbine wheel and compressor being surrounded by housing means and being mounted for rotation about a central axis therein, the rotation thereof causing said compressor to generate compressed gas for utilization in said combustion chamber, said turbine wheel having openings therein for the flow of cooling gas and having a circularly disposed undulating surface symmetrically disposed with respect to said axis of rotation, upon which surface are arrayed a large plurality of active surfaces, disposed at an angle to the plane of said circularly disposed surface, at least one turbine inlet duct connected to said combustion chamber, with the hot gases emanating from said combustion chamber being directed essentially perpendicularly toward said active surfaces on said turbine wheel, the reaction of such hot gases upon said active surfaces causing said turbine wheel to rotate and thus drive said compressor in rotation, and at least one exhaust collection duct for the disposition of hot gases after they have reacted against said turbine, said compressor additionally supplying compressed gas for cooling said turbine wheel, means for directing said cooling gas from said compressor to and through said openings in said turbine wheel such that said cooling gas is interposed between said active surfaces and said hot gases, thus to extend the useful life of said turbine wheel, said exhaust collection duct additionally disposing of spent cooling gases.

17. The turbine engine claimed in claim 16, in which said exhaust duct is an arcuate member having one side open adjacent said turbine rotor and one end open so as to form a passage wherein spent gases collect and depart said turbine engine.

18. The turbine engine claimed in claim 16 in which said circularly disposed undulating surface includes sections essentially perpendicular to said angular orientation of said turbine inlet means interposed with other sections essentially parallel thereto.

19. The turbine engine as defined in claim 17 wherein said circular portion of said rotor includes undulations, said undulations including surfaces essentially perpendicular to said turbine inlet ducts and alternate surfaces essentially parallel thereto.

20. A turbine including a rotor, said rotor being mounted on a shaft with suitable bearings so as to freely rotate and having a suitable housing in a surrounding relationship to said rotor, turbine inlet means, said turbine inlet means consisting of at least one turbine inlet duct oriented at an acute angle with respect to a circular portion of said rotor and adjacent thereto, said turbine inlet means being provided for the purpose of directing hot gases toward said circular portion of said rotor, exhaust means, said exhaust means comprising ducts having an opening adjacent said circular portion of said rotor and being provided to conduct spent gases away from said rotor, said turbine inlet means and said exhaust means being alternately disposed adjacent said circular portion of said rotor, cooling fluid means, said cooling fluid means being adjacent a different portion of said rotor than said circular portion, a plurality of internal passages in said rotor, said internal passages communicating between said circular portion and said different portion of rotor, said internal passages serving to conduct cooling fluids to said circular portion of said rotor so as to permit said cooling fluids to interpose between said hot gases and said turbine rotor, thereby to substantially prolong the life of said turbine rotor and to permit extremely high temperature gases to be directed at said turbine rotor without damage thereto.

* * * * *